United States Patent
Rasanen

(10) Patent No.: US 6,678,527 B1
(45) Date of Patent: Jan. 13, 2004

(54) MULTIMEDIA AND MULTISERVICE CALLS IN MOBILE NETWORK

(75) Inventor: Juha Rasanen, Espoo (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/601,723

(22) PCT Filed: Feb. 8, 1999

(86) PCT No.: PCT/FI99/00090

§ 371 (c)(1),
(2), (4) Date: Aug. 7, 2000

(87) PCT Pub. No.: WO99/43172

PCT Pub. Date: Aug. 26, 1999

(30) Foreign Application Priority Data

Feb. 9, 1998  (FI) .................................................. 980293

(51) Int. Cl.[7] ................................................. H04Q 7/20
(52) U.S. Cl. ...................... 455/450; 455/509; 370/341; 370/329
(58) Field of Search ................................ 455/450–451, 455/452, 453, 509, 510, 511, 512, 62; 370/465, 468, 337, 347, 329, 349, 471, 264, 341

(56) References Cited

U.S. PATENT DOCUMENTS

| 5,398,247 A | * | 3/1995 | Delprat et al. ............. 370/347 |
| 5,710,766 A | | 1/1998 | Schwendeman |
| 5,742,592 A | * | 4/1998 | Scholefield et al. ........ 370/329 |
| 5,822,372 A | * | 10/1998 | Emami ....................... 375/260 |
| 5,901,143 A | | 5/1999 | Rotter et al. |
| 5,930,233 A | * | 7/1999 | Kanerva et al. ............. 370/231 |
| 5,940,763 A | * | 8/1999 | Alperovich et al. ......... 455/450 |
| 6,052,385 A | * | 4/2000 | Kanerva et al. ............. 370/468 |
| 6,058,118 A | * | 5/2000 | Rault et al. ................ 370/464 |

FOREIGN PATENT DOCUMENTS

| EP | 794 680 | 9/1997 | |
| JP | 04345357 A | * 12/1992 | .......... H04M/11/00 |
| JP | 08195788 A | * 7/1996 | .......... H04L/29/08 |

* cited by examiner

Primary Examiner—William Trost
Assistant Examiner—Congvan Tran
(74) Attorney, Agent, or Firm—Pillsbury Winthrop LLP

(57) ABSTRACT

One common traffic channel is allocated to a multiservice call which requires simultaneous transmission of two or more different information flows apart from one another. This common traffic channel is divided into a transparent and a non-transparent sub-channel. The transmitting end is provided with a multiplexer (73) which multiplexes the different information flows (75, 76) to the common traffic channel. The receiving end is provided with a demultiplexer (74) which demultiplexes the signal received from the common traffic channel back into separate information flows (75, 76). The transparent sub-channel is used for transmitting time-critical information, such as video and audio, which does not allow the use of an error correction protocol based on retransmission, and the non-transparent sub-channel can be used for transmitting less time-critical information, such as data files, which allows the use of error correction based on retransmission.

26 Claims, 4 Drawing Sheets

MULTIMEDIA AND MULTISERVICE CALLS IN MOBILE NETWORK

Figure 1:
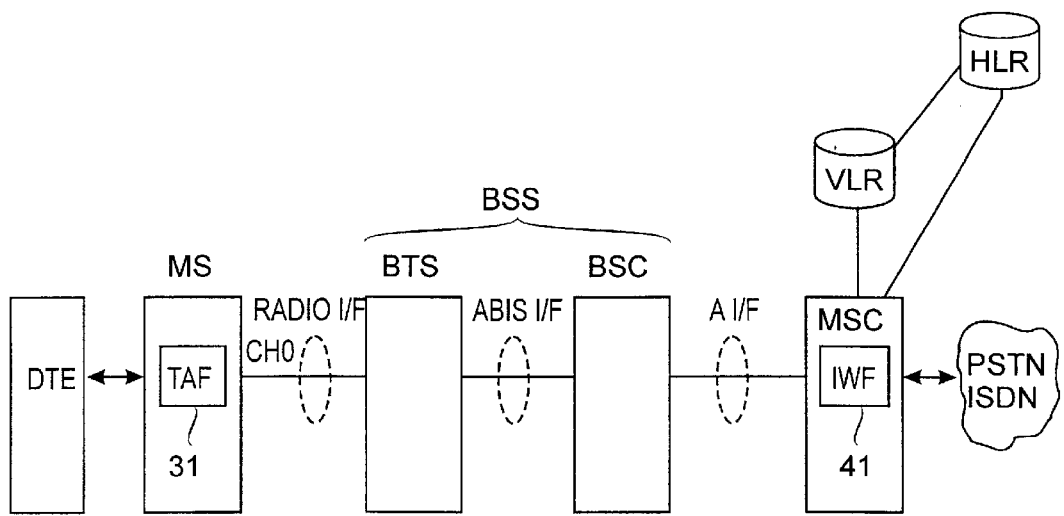

This application is the national phase of international application PCT/FI99/00090 filed Feb. 8, 1999 which designated the U.S.

The invention generally relates to mobile communication networks and particularly to implementation of multiservice and multimedia calls in mobile communication systems.

In addition to conventional speech transmission, modern mobile communication systems offer various data transmission features to subscribers. The services of mobile communication systems are generally classified into tele-services and bearer services. A bearer service is a telecommunications service which provides signal transmission between the user interfaces and the network interfaces. An example of bearer services is a modem service. In the tele-service terminal services are also offered by the network. Important tele-services include speech, telefax and videotex services. The bearer services are usually subdivided into groups, such as asynchronous bearer services and synchronous bearer services, on the basis of a certain feature. In the case of the asynchronous bearer service the transmitting terminal and the receiving terminal are able to maintain their synchronization only for each single character to be transmitted. In the case of the synchronous bearer service the transmitting terminal and the receiving terminal are synchronized with each other for the whole duration of data transmission. Each such bearer service group comprises a number of bearer services, such as a transparent service and a non-transparent service. In the transparent service the data to be transmitted is unstructured and transmission errors are corrected only by means of channel coding. In the non-transparent service the data to be transmitted is structured into protocol data units (PDU) and transmission errors are corrected using automatic retransmission protocols (in addition to channel coding).

Existing mobile communication systems do not offer any special bearer services for multimedia calls or for simultaneous use of multiple data services. There is only one traffic channel available for a data call, the channel being either transparent (T) or non-transparent (NT). Depending on the required transmission rate a traffic channel may consist of one sub-channel (e.g. TDMA time slot) or several sub-channels (e.g. several TDMA time slots for high-speed data transmission, such as HSCSD in the GSM system). Any shared use of the traffic channel has to be implemented on the application layer, i.e. in the end user's applications. Time-critical multimedia calls, e.g. video phoning, have to use transparent circuit-switched bearer services because other data services cannot guarantee as small variation of the transmission delay as the video service requires. Too long a transmission delay causes visible interference in the video image at the receiving end. Applications which are not time-critical and require accurate transmission usually use non-transparent bearer services. An example of such an application is transfer of data files.

Figure 2:
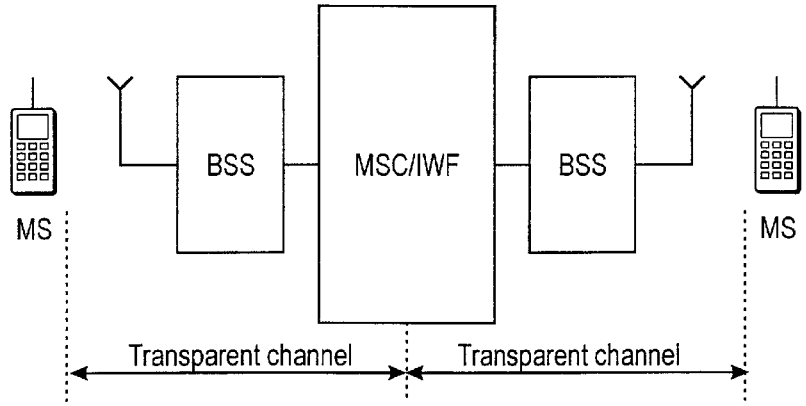

FIG. 2 illustrates a conventional video call which is connected through a GSM mobile communication system (Global System for Mobile Communication). The point-to-point transmission link between the mobile stations MS1 and MS2 consists of a first transparent traffic channel between the MS1 and an interworking function IWF, which is located in a mobile services switching centre MSC, and of a second transparent traffic channel between the MS2 and the IWF.

The European Telecommunications Standard Institute (ETSI) has begun to define an application programming interface and environment (Mobile API/Mobile Application Programming Interface MEXE/Mobile Execution Environment) which provide an opportunity e.g. for operators and parties independent of mobile station producers to develop applications and services for mobile users. This development work also comprises a multiplexed interface between the terminal equipment (TE) and the mobile station MS. This multiplexed interface comprises a multiplexed protocol and enables simultaneous use of several activities and/or services between the TE and the MS through one serial link. Examples of suitable services are data services and short message services. A TE which is to use simultaneously both the data service and the short message service activates multiplexing in which the data of both services are multiplexed into one data stream and supplied to the mobile station MS through the serial link. The MS carries out a similar multiplexing procedure in which the short message data is separated from the data service data and the data is transmitted to the corresponding units in the mobile station MS. After this the MS transmits the data service data, e.g. speed, telefax or data file, over the allocated transparent or non-transparent traffic channel in the usual manner. The short message data is transmitted outside the traffic channel, as is defined e.g. in the GSM system. Other activities, such as GPRS and USSD which use transmission outside the GSM traffic channel and e.g. information on the battery status, configuration information, phone books, etc., can also be transmitted over the TE-MS interface in the same way as short messages MSS. Thus this arrangement does not improve implementation of multimedia calls and multiservice calls in a mobile communication network, either.

As was stated above, the problem related to the present mobile communication systems is that they either provide a transparent or non-transparent traffic channel or a packet service (such as GPRS, General Packet Radio Service) for a multimedia call between two mobile stations or between a mobile station and a terminal or server in a fixed network. Packet radio services and the non-transparent traffic channel are not suitable for video phoning or other time-critical applications. On the application layer the transparent bearer service requires an error correction protocol which is usually not optimized for a radio connection. This means that a multiservice and/or multimedia channel has to always use a transparent bearer service and perform multiplexing and error correction on the application layer in the end users' terminals.

Another problem that may arise concerns rate adaptation between the fixed network traffic channel and the transparent mobile network traffic channel. The mobile network traffic channel and the fixed network traffic channel may have different bit rates, e.g. 28.8 kbits/s (2*14.4 kbits/s) on the GSM traffic channel and 32 kbits/s on the fixed network traffic channel, which is in accordance with the ITU-T H.221 recommendation (Telecommunication Standardisation Sector of International Telecommunication Union). The different rates of the traffic channels cause an unbearable situation on the transparent point-to-point traffic channel because the bit rate has to be constant over the whole point-to-point connection. The GSM recommendations teach to use a GSM channel with a higher rate and fill the excess capacity with a useless fill. On the GSM sub-connection it is possible to use for example a traffic channel of 38.4 kbits/s, of which 32 kbits/s are user data and 6.4. kbits/s fill data, and a fixed network sub-connection of 32 kbits/s on which 32 kbits/s of user data are transmitted. This prior art method, however, wastes valuable radio channel resources.

The objective of the invention is to enable multimedia and multiservice calls in mobile communication systems in a simple manner, utilizing the radio channel resources effectively.

This is achieved with a method of transmitting two or more different information flows simultaneously in one call in a mobile communication network, the method being characterized in that it comprises the steps of: assigning one mobile network traffic channel to the call; dividing the assigned traffic channel into at least two sub-channels, and transmitting at least one information flow in each virtual sub-channel.

The invention also relates to methods of making a multiservice or multimedia call according to claims 2 and 10, a mobile station according to claim 11 and mobile communication networks according to claims 15 and 19.

According to the basic idea of the invention, one common traffic channel is allocated to a call, such as a multimedia or multiservice call, which requires simultaneous transmission of two or more different information flows apart from one another. Here the term traffic channel refers both to a single channel and to a set of two or more parallel sub-channels used in high-speed multichannel data transmission (e.g. the HSCSD channel of the GSM system). This common traffic channel is divided into at least two parts depending on the number of information flows that are to be transmitted separately, and each information flow is transmitted in a dedicated part of the traffic channel independently of the other flows. The transmitting end is provided with multiplexing means which multiplexes different information flows into a common traffic channel. The receiving end is provided with demultiplexing means which demultiplexes the signal received from the common traffic channel back into separate information flows. In a preferred embodiment of the invention at least one transparent information flow and at least one non-transparent information flow are multiplexed to the common traffic channel. Thus for example time-critical information which does not allow the use of an error correction protocol based on retransmission can be transmitted over the transparent sub-channel, and the non-transparent sub-channel can be used for transmitting less time-critical information which allows error correction based on retransmission. Two or more transparent signals (such as speech and video) may be multiplexed into one signal which is transmitted over the transparent sub-channel of the traffic channel. The non-transparent information flow may include e.g. data files. Several non-transparent signals may be multiplexed into one non-transparent data flow which is transmitted through the non-transparent part of the traffic channel.

The invention enables implementation of multiservice calls through the traditional mobile network traffic channel. The necessary multiplexing and demultiplexing are carried out in the terminals and interworking functions of the mobile communication network. Thus these functions do not need to be performed on the application layer by the end user like in prior art solutions. Thanks to the invention, one part of a multimedia or multiservice call can use a transparent bearer service and the other a non-transparent bearer service, whereas in the prior art the whole multimedia call had to use only the transparent bearer service.

Since the multiplexing and demultiplexing functions of the invention can be carried out in the mobile stations and interworking functions of the mobile network, the invention can be implemented without changes or with only minor changes in other parts of the network. In a preferred embodiment of the invention a transparent traffic channel is established first between two mobile stations or between a mobile station and an interworking function according to the normal call set-up procedure of the mobile communication network. After this the mobile stations or the mobile station and interworking function negotiate with each other using inband signalling about allocation of the transparent traffic channel to sub-channels. This inband negotiation can be implemented e.g. by means of a radio link protocol intended for a non-transparent traffic channel in the mobile communication system. When inband signalling is used, the rest of the mobile communication network does not necessarily need to support allocation of the traffic channel to different kind of data according to the invention in any way or be aware of this. In the case of a call between two mobile stations, a traditional transparent traffic channel connection can be established through the mobile communication network and the multplexing functions according to the invention carried out only in the mobile stations which also negotiate with each other about the allocation of the traffic channel through the traffic channel. Establishment of the traffic channel which is allocated to at least two sub-channels according to the invention can also be established by means of outband signalling, but this usually requires changes in the signalling messages, signalling procedures and network elements in different parts of the mobile communication network.

The present invention also provides a solution to the above-mentioned problem caused by the different bit rates of the mobile network transparent traffic channel and the fixed network transparent traffic channel. A transparent traffic channel whose bit rate R1 is close to the bit rate R2 of the fixed network transparent traffic channel is established between the mobile station and the interworking function. Considering effective utilization of the radio channel resources, it is preferable that R2 >R1, but the basic idea of the invention is also applicable to cases in which R1 =R2 and R1 >R2. After this equal shares of both the fixed network traffic channel and the mobile network traffic channel are allocated for transparent transmission, the bit rate of the shares being R3, when R3<R1 and R3<R2. Thus we can establish a point-to-point transparent connection which has a constant bit rate, i.e. R3. The remaining shares of the mobile network traffic channel and the fixed network traffic channel are allocated for non-transparent transmission. The bit rates R1–R3 and R2–R3 of the remaining shares may differ. However, the flow control and buffering in the interworking function according to the non-transparent protocol adjust the difference in bit rate and ensure data integrity in all situations. Thus the invention allows to avoid allocation of a traffic channel with an unnecessarily high speed to a transparent call to the fixed network and waste of excess capacity on transmission of fill data. Instead, the invention allows to set the bit rate of the transparent connection according to the need and use the excess capacity for non-transparent transmission. Furthermore, the invention enables multimedia and multiservice calls between the mobile station and the fixed network.

Figure 3:
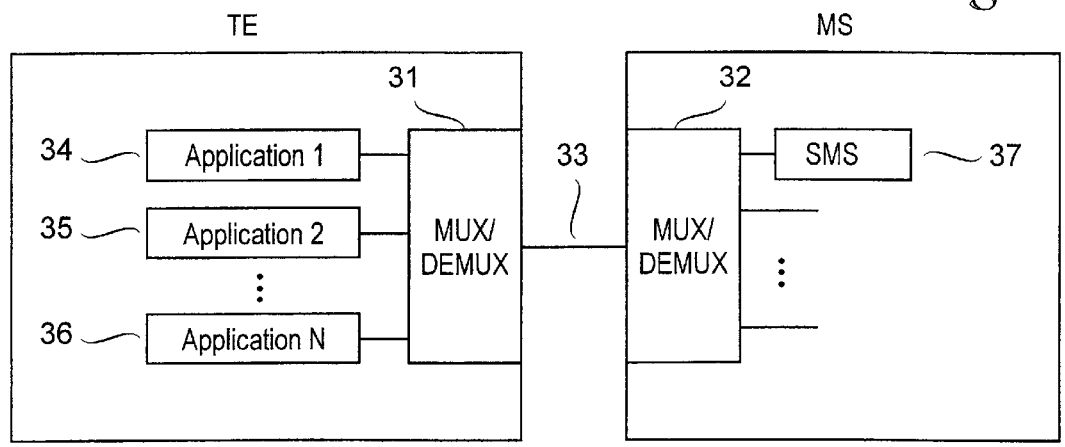
Figure 4:
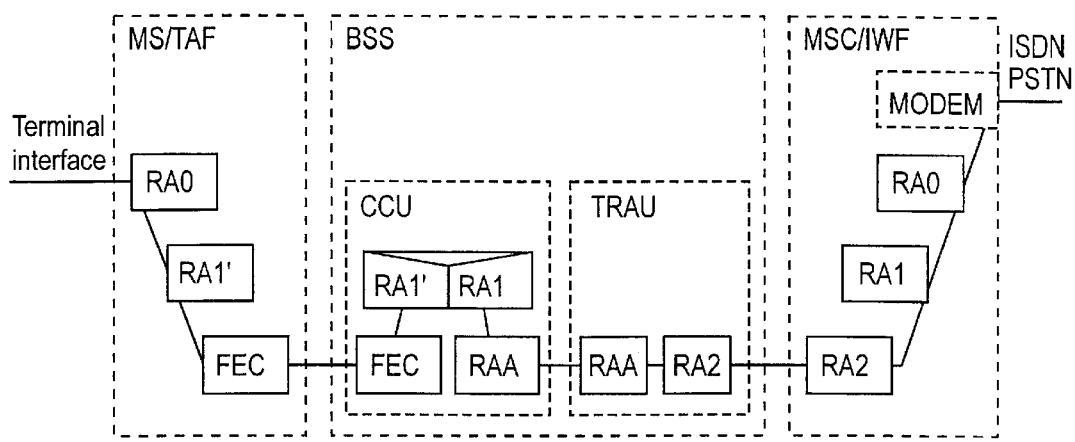
Figure 5:
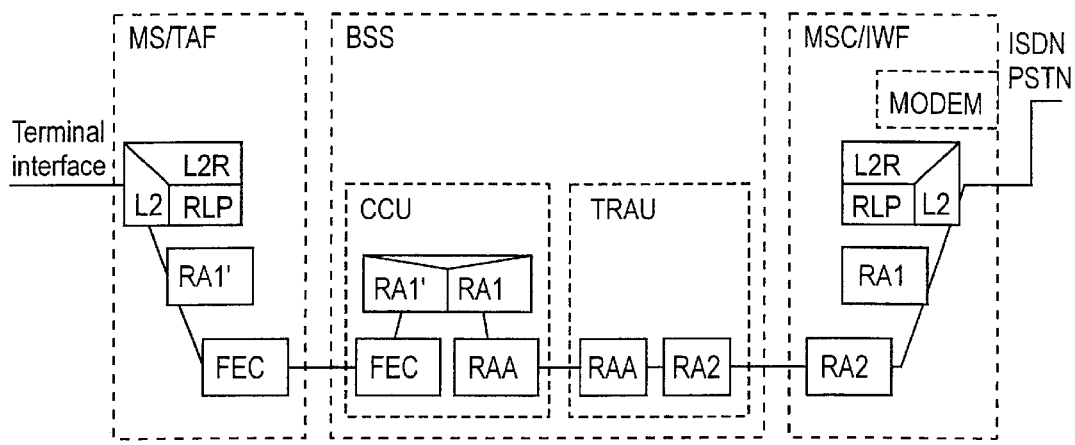
Figure 6:
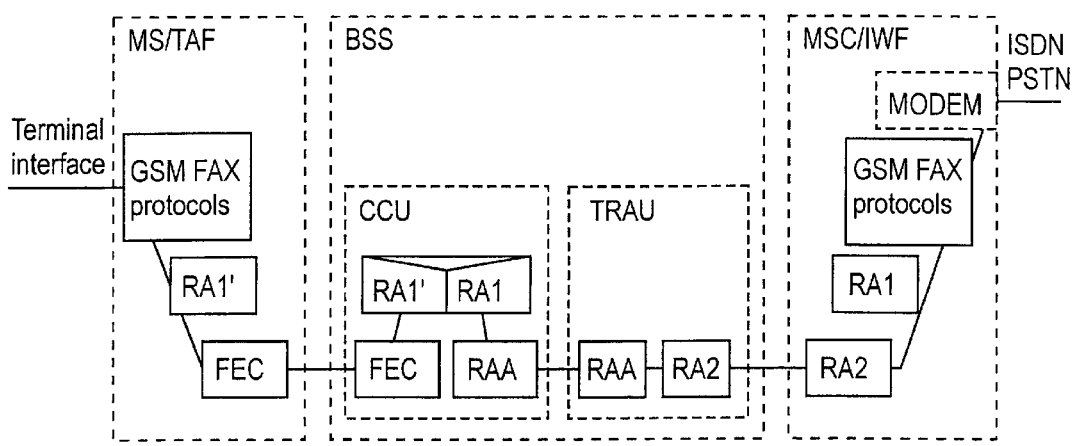
Figure 7:
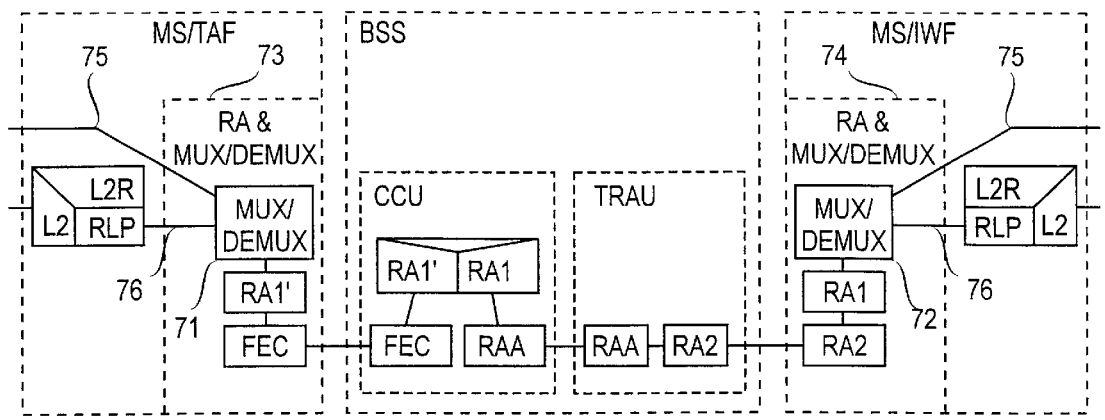
Figure 9:
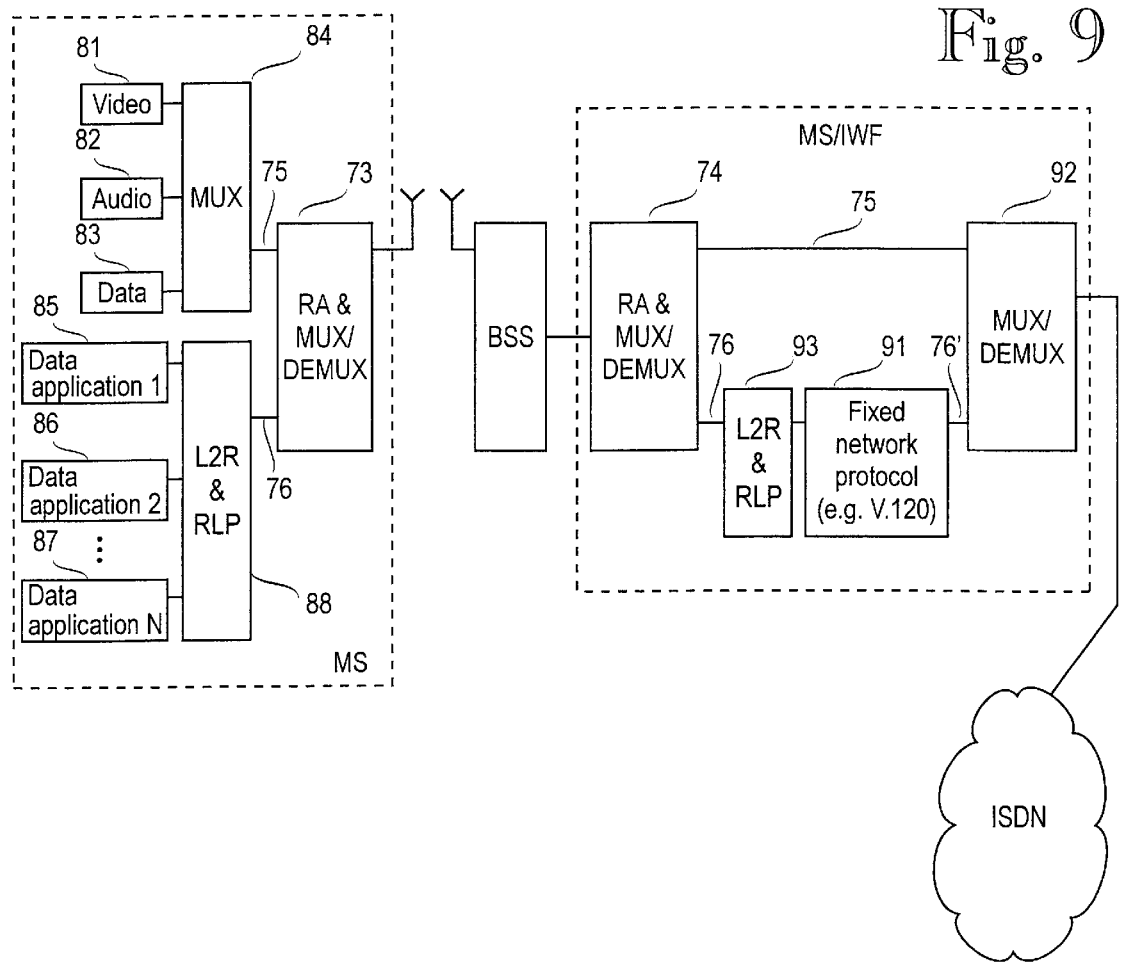
Figure 8:
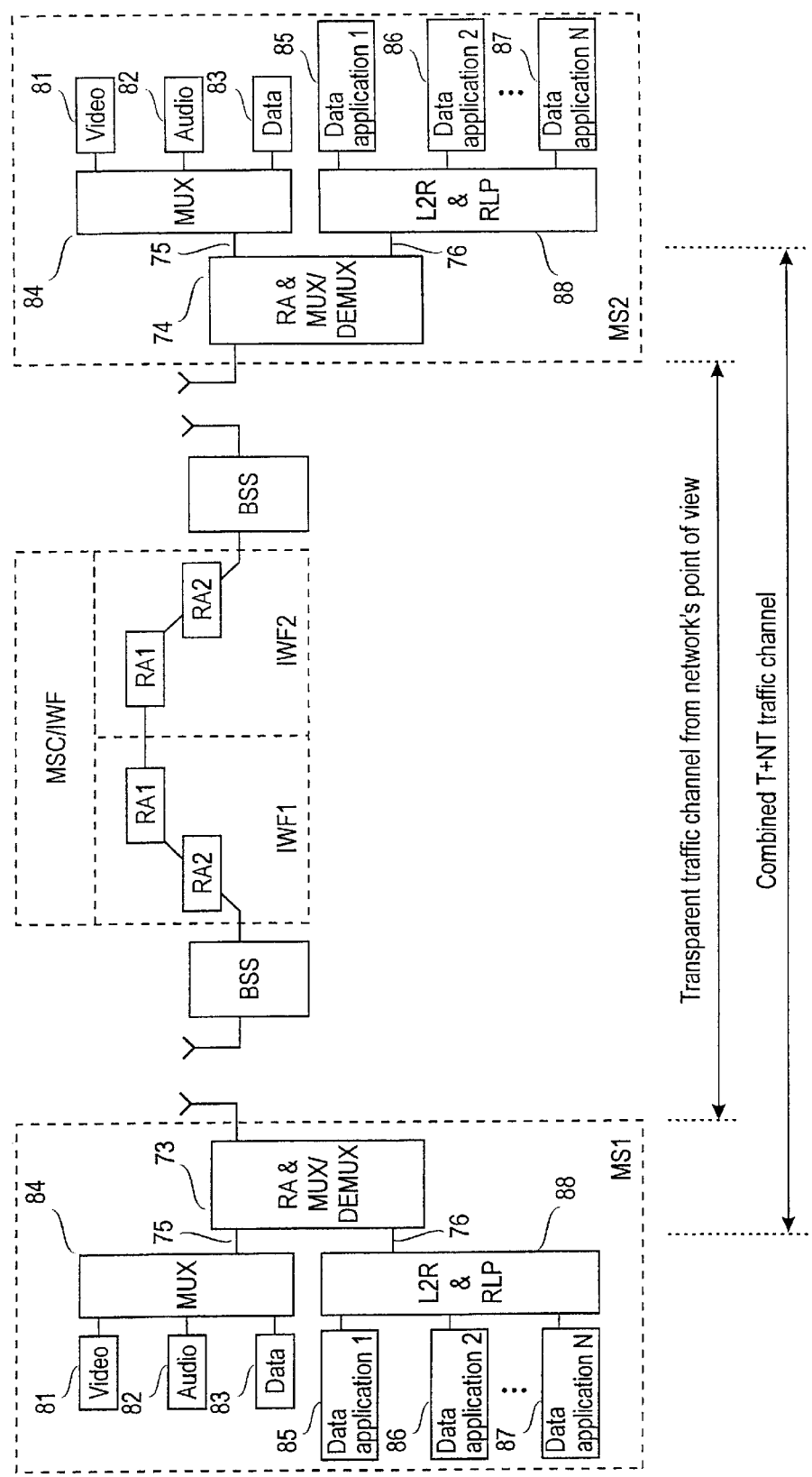

Preferred embodiments of the invention will be described in the following with reference to the accompanying drawings, in which FIG. 1 illustrates a mobile communication system, FIG. 2 illustrates a prior art video phone connection through the GSM network, FIG. 3 illustrates an API/MEXE concept, FIGS. 4, 5 and 6 illustrate protocols and functions which are needed in transparent and non-transparent bearer services in the GSM system and in a transparent service of telefax group 3, FIG. 7 illustrates protocols and functions for implementing a multiservice or multimedia call according to the invention, FIG. 8 is a block diagram illustrating a multiservice or multimedia call between two mobile stations, FIG. 9 is a block diagram illustrating a multiservice or multimedia call between a mobile station and a terminal or server in the fixed network.

The present invention is applicable to all digital wireless telecommunications systems, such as cellular systems, WLL (Wireless Local Loop) and RLL (Radio Local Loop) networks, satellite-based mobile communication systems, etc. Here the term mobile communication system (or network) generally refers to all wireless telecommunications systems. There are several multiple access modulation techniques which facilitate traffic involving a large number of mobile users. These techniques include time division multiple access (TDMA), code division multiple access (CDMA) and frequency division multiple access (FDMA). The physical concept of the traffic channel varies in different multiple access methods, being primarily defined by means of a time slot in TDMA systems, by means of a spreading code in CDMA systems, by means of a radio channel in FDMA systems, by means of a combination of these, etc. In modern mobile communication systems it is possible to allocate a set of two or more basic-rate traffic channels (sub-channels) or substreams, i.e. a high-speed traffic channel, such as HSCSD traffic channel in the GSM system, to a mobile station for high-speed data transmission. Here the term traffic channel refers both to a single basic-rate traffic channel and to a high-speed traffic channel consisting of two or more basic-rate traffic channels or substreams. The basic idea of the present invention is independent of the type of the traffic channel and the multiple access method used.

The present invention is particularly suitable for data transmission applications in the Pan-European digital mobile communication system GSM (Global System for Mobile Communications) and in other GSM-based systems, such as DSC1800 (Digital Communication System), the US digital cellular system PCS (Personal Communication System), and in WLL systems which are based on the above-mentioned systems. The invention will be described below using the GSM mobile communication system as an example. The structure and function of the GSM system are very familiar to a person skilled in the art and they are defined in the GSM specifications of ETSI (European Telecommunications Standards Institute). Reference is also made to *GSM System for Mobile Communication*, M. Mouly and M. Pautet, Palaiseau, France, 1992; ISBN: 2-9507190-0-7.

The basic structure of the GSM system is illustrated in FIG. 1. The GSM system consists of two parts: a base station system BSS and a network subsystem NSS. The BSS and mobile stations MS communicate over radio connections. In the base station system BSS each cell is served by a base transceiver station BTS. A number of base transceiver stations are connected to a base station controller BSC, which controls the radio frequencies and channels the BTS uses. The BSCs are connected to a mobile services switching centre MSC. Certain MSCs are connected to other telecommunications networks, such as the public switched telephone network PSTN, and comprise gateway functions for calls transmitted to those networks and calls arriving from those networks. These MSCs are known as gateway MSCs (GMSC). There are also at least two databases, a home location register HLR and a visitor location register VLR.

The mobile communication system comprises adaptation functions for adapting the internal data connection of the mobile network to the protocols used by the terminals and other telecommunications networks. The adaptation functions typically include a terminal adaptation function TAF on the interface between the mobile station and the data terminal connected to the mobile station and an interworking function IWF on the interface between the mobile communication network and another telecommunications network, typically in association with the mobile services switching centre. Usually the mobile services switching centre comprises various kinds of adapter equipment pools for supporting different data services and data protocols, such as a modem pool which comprises modems and telefax adapters for modem and telefax services, UDI/RDI rate adapter pool, etc. Referring to FIG. 1, in the GSM system a data connection is established between the terminal adaptation function TAF 31 of the mobile station MS and the interworking function IWF 41 in the mobile communication network. In the case of data transmission in the GSM system this connection is an UDI coded digital full duplex connection adapted to V.24 interfaces. In non-transparent data services the GSM connection also uses a radio link protocol RLP. The TAF adapts the data terminal equipment DTE connected to the mobile station MS to said GSM data connection, which is established over a physical connection using one or more traffic channels. The IWF connects the GSM data connection to a V.110 or V.120 network, such as an ISDN network or another GSM network, or to another transit network, such as the public switched telephone network PSTN. The CCITT recommendation for a V.120 rate-adapted connection is disclosed in the publication CCITT White Book: V.120.

As was explained above, modern mobile communication systems support different tele-services and bearer services. The bearer services of the GSM system are defined in the GSM specification 02.02 and the tele-services in the GSM specification 02.03.

FIGS. 4, 5 and 6 illustrate examples of protocols and functions which are needed in the IWF (either in the MSC or in a WLL-specific network element) for transparent bearer services, non-transparent bearer services and a transparent service of telefax group 3. The non-transparent circuit-switched connection over the GSM traffic channel between the terminal adaptation function TAF and the interworking function IWF comprises several protocol layers which are common to all these services. These include various rate adaptation functions RA, such as RA1' between the terminal adaptation function TAF and the CCU unit (Channel Codec Unit) located in the base station system BSS, RA1 between the CCU unit and the interworking function IWF, RAA between the CCU unit and a transcoder unit TRAU located remote from the base station, and RA2 between the transcoder unit TRAU and the interworking function IWF. Rate adaptation functions RA are defined in GSM recommendations 04.21 and 08.20. Traffic between the CCU unit and the transcoder unit TRAU is defined in the GSM recommendation 08.60.

At the radio interface the RA1' rate-adapted information has also been channel-coded according to the GSM recommendation 5.03, which is illustrated by the FEC blocks in the mobile station MS and CCU unit. The IWF and TAF also comprise protocols of upper layers which are service-specific. In an asynchronous transparent bearer service of FIG. 4 the IWF needs asynchronous-synchronous conversion RA0 and a modem or a rate adaptation function in the direction towards the fixed network. The transparent signal passes through the traffic channel between the terminal interface and the PSTN/ISDN. Transparent synchronous configuration is otherwise similar but does not comprise rate adaptation RA0. The transparent configuration is very suitable for transmission of video picture and speech, for example, because the transmission delay caused by the traffic channel is relatively constant.

In the asynchronous non-transparent bearer service of FIG. 5 the L2R (Layer 2 Relay) and RLP (Radio Link Protocol) protocols and a modem or a rate adaptation function in the direction towards the fixed network are needed in the IWF. L2R functionality for non-transparent character-oriented protocols is defined e.g. in the GSM recommendation 07.02. The RLP protocol is defined in the GSM recommendation 04.22. The RLP is a frame-structured, balanced (HDLC type) data transmission protocol in which error correction is based on retransmission of corrupted frames at the request of the receiving party. The interface between the IWF and e.g. the audiomodem MODEM is in accordance with CCITT V.24. In FIG. 5 this interface is indicated with symbol L2. This configuration is particularly suitable e.g. for file transfer which requires a small number of errors but in which even a great variation of the transmission delay does not cause problems.

In FIG. 6 the IWF needs GSM telefax protocol functions and a modem. The telefax connection of FIG. 4 is also transparent. The GSM telefax service is defined in the GSM recommendation 03.45.

As was stated above in the background description of the invention, in the present GSM system a multimedia call, in which e.g. data is transmitted in addition to video or audio, always requires a transparent traffic channel according to FIGS. 4 and 6 in the GSM network, and any multiplexing and error correction has to be carried out on the application layer.

Furthermore, if the bit rates of the fixed network traffic channel and the GSM traffic channel are different, radio channel resources are used ineffectively.

According to the basic idea of the invention, these problems can be solved by allocating one common transparent traffic channel which is divided e.g. into two parts to a multimedia or multiservice call which requires both a transparent and a non-transparent connection. Transparent transmission is performed in one of these parts independently of the non-transparent transmission which is performed in the other part. FIG. 7 illustrates a way in which the invention can be implemented in the protocol structure of the GSM system between the mobile station MS and the interworking function IWF.

Referring to FIG. 7, a transparent traffic channel has been established between the rate adaptation functions RA1' and RA1 according to the GSM recommendations. The mobile station MS is provided with a multiplexing and demultiplexing unit 71 which is established between the rate adaptation function RA1' and the terminal interface and the L2R/RLP unit. In the transmission direction the multiplexing and demultiplexing unit 71 receives a transparent information flow 75 from the terminal interface and a non-transparent information flow 76 from the L2R/RLP unit and multiplexes these information flows into one signal which is supplied to the common transparent traffic channel via the rate adaptation function RA1'. In the receiving direction the multiplexing and demultiplexing unit 71 correspondingly demultiplexes the transparent 75 and non-transparent 76 information flows from the signal which is received via the common transparent traffic channel, and supplies the transparent information flow to the terminal interface and the non-transparent information flow to the L2R/RLP unit. A corresponding multiplexing and demultiplexing unit 72 is located between the rate adaptation function RA1 and the terminal interface and the L2R/RLP unit in the interworking function IWF. Even though the multiplexing and demultiplexing 71 and 72 according to the invention are for the sake of clarity illustrated in FIG. 7 as located between the rate adaptation function RA1 and the terminal interface, in practice multiplexing and demultiplexing may be integrated together with the rate adaptation functions RA1' and RA1. In the following these functions will in fact be described as single units RA&MUX/DEMUX 73 and 74.

As a result of the arrangement according to the invention, transparent transmission which uses part of the traffic channel's capacity, i.e. a transparent sub-channel, occurs between the terminal interfaces in the mobile station MS and the interworking function IWF. Non-transparent transmission which uses part of the traffic channel's capacity, i.e. a non-transparent sub-channel, occurs between the L2R/RLP units. Thus both a transparent and a non-transparent service can be provided for the same call through the common traffic channel. This enables multiservice and multimedia calls in the GSM network.

The traffic channel capacity can be allocated e.g. by allocating specific information bits transmitted on the traffic channel to a transparent sub-channel and specific information bits to a non-transparent sub-channel or by allocating the whole channel momentarily for non-transparent transmission and momentarily for transparent transmission (in which case the rate variations are balanced by means of buffering). In the GSM system, for example, V.110 frames are transmitted between the RA1' and RA1 adaptation functions. Some of the data bits of these frames may be allocated for transparent transmission and some for non-transparent transmission.

In the most typical application the traffic channel is divided into two parts, a transparent one and a non-transparent one, as was described above. The invention is, however, not restricted to this division. The traffic channel may be divided into an arbitrary number of parts which can be freely allocated for transparent and non-transparent services. For example, only transparent or non-transparent sub-channels may be established in the traffic channel. In another embodiment the traffic channel may comprise one or more transparent sub-channels and one or more non-transparent sub-channels. A respective terminal interface or L2R/RLP unit is needed for each sub-channel in the IWF and MS.

It is also typical that a larger share of the capacity is allocated for transparent transmission (e.g. video) than for non-transparent transmission (e.g. data). However, allocation of capacity can be adjusted according to the need and the parties may negotiate about the allocation at the beginning of a call or during it.

In a preferred embodiment of the invention the IWF and the MS (or two MS) negotiate with each other about allocation of the transparent traffic channel to sub-channels using inband signalling. In the GSM system, for example, this inband negotiation can be implemented by means of the XID mechanism and XID frames of the radio link protocol RLP which are usually used for signalling over a non-transparent connection. The negotiation process may be for example the following kind of process. When a transparent traffic channel (undivided) has been established, the RA&MUX/DEMUX 73 sends a XID frame including a proposal for a certain channel division to the unit 74. The unit 74 replies with a XID frame, in which the channel division is either accepted or another kind of channel division is suggested. If necessary, the unit 73 acknowledges with a XID frame. After this the units 73 and 74 start multiplexing in the negotiated manner. The negotiations about establishment of a connection can also be carried out using outband signalling, but this approach is less advantageous. In the normal GSM call set-up the MSC receives a BCIE element (Bearer Capability Element) in the set-up message from the mobile station (or from the subscriber database or another switching centre). The BCIE element includes information on the call type as well as on the bearer services and the protocol the call requires. On the basis of this information the MSC can select and initialize the IWF equipment suitable for the service in question. In an embodiment of the invention the BCIE element can be provided with a new parameter or parameter value which enables the MSC to choose the IWF equipment supporting the functionality of the invention for the call. Alternatively, a definition of the capacity (e.g. the bit rate) the transparent part and the non-transparent part of the channel require can be included in the BCIE element. In that case the sub-channels of the traffic channel are divided in the IWF according to this information and no inband negotiation is needed (unless negotiation is needed for another reason).

The transparent information flow 75 and/or the non-transparent information flow 76 may also comprise signals into which two or more subsignals have been multiplexed. Referring for example to FIG. 8, the MS1 and MS2 comprise a multiplexing and demultiplexing unit 84 which multiplexes the signals received from video, audio and data sources into one transparent multimedia signal 75, which is then transmitted over a transparent sub-channel. The L2R/RLP unit correspondingly multiplexes the data signals received from several data applications 85, 86 and 87 into one non-transparent signal 76, which is transmitted over a non-transparent sub-channel.

In the following, a call between two mobile stations according to the invention is used as an example and described with reference to FIG. 8. It is assumed first that the MS1 is to make a multimedia call to another mobile station MS2. The MS1 requests establishment of a transparent GSM traffic channel between the MS1 and the MS2. The call is set-up in a manner characteristic of the GSM system. A first transparent GSM traffic channel is established between the MS1 and a first interworking function IWF1, and a second transparent traffic channel is established between the MS2 and a second interworking function IWF2. The MSC switches the rate adaptation functions RA1 of the interworking functions IWF1 and IWF2 to each other, and thus a transparent point-to-point traffic channel is established between the mobile stations MS1 and MS2 and the RA and MUX/DEMUX units 73. No features or functions deviating from the GSM recommendations is required from the mobile communication network MSC or another mobile communication network.

After this the mobile stations MS1 and MS2, preferably their units 73, perform inband negotiations and allocate part of the capacity of the transparent traffic channel for transparent transmission between applications 81, 82 and 83 (e.g. a video phone) and part of the capacity for non-transparent transmission between applications 85 to 86 and 87. The above-mentioned XID mechanism or another inband procedure, for example, can be used for inband negotiation. A highly preferred manner of implementing the inband negotiation is to establish an RLP protocol between the L2R/RLP units 88 through a full-rate (unallocated) transparent traffic channel and to perform the negotiation about allocation of the traffic channel parts through this RLP connection (e.g. by means of XID frames). The RLP protects against transmission errors on the radio path during negotiation considerably better than other inband signalling methods.

After the channel capacity has been allocated, an RLP protocol is established between the L2R/RLP units 88 in the part of the traffic channel which is allocated for non-transparent data transmission. After this video 81, audio 82 and any other time-critical multimedia information 83 are multiplexed into a transparent information flow 75 by means of the multiplexer 84. The RA and MUX/DEMUX unit 73 multiplexes the information flow 75 to the part of the traffic channel that was allocated for transparent transmission. Correspondingly, less time-critical data from the data applications 85, 86 and 87 are multiplexed into a non-transparent signal flow 76 in the L2R/RLP unit 88. The RA and MUX/DEMUX unit 73 multiplexes the information flow 76 to the part of the transparent traffic channel that was allocated for non-transparent transmission. The unit 73 sends the information through the transparent traffic channel (mobile communication network) to the corresponding RA and MUX/DEMUX unit 73 of the mobile station MS2. The unit 73 demultiplexes the transparent information flow 75 from the transparent part of the traffic channel and the non-transparent information flow 76 from the non-transparent part of the traffic channel. The multiplexing and demultiplexing unit 84 demultiplexes the video 81, audio 82 and any other multimedia information 83 from the transparent information flow 75. Correspondingly, the L2R/RLP unit 88 demultiplexes the data from the non-transparent information flow to each data application 85 to 87. Information is transmitted in the same way in the opposite direction.

In the example of FIG. 8 a combined transparent (T) and non-transparent (NT) traffic channel was established between the mobile stations MS1 and MS2 for multimedia and multiservice calls. The invention requires new features only in the mobile stations. In respect of the mobile communication network the traffic channel in question is still a conventional transparent traffic channel and no additional features are required from the network. Thanks to this, the present invention is applicable to a call between two mobile stations that support the invention in existing mobile communication networks.

In the following, an example of a multiservice call according to the invention from the mobile station MS to a fixed network (e.g. ISDN) is described with reference to FIG. 9.

The mobile station MS requests both a non-transparent and a transparent GSM channel in a call set-up message and determines the capacity (e.g. bit rate) for both parts of the whole traffic channel. The MS also requests an adequate amount of channel capacity (gross capacity) for the fixed network part. The MS may also define the desired fixed network channel configuration in call set-up signalling, i.e. how the fixed network channel is to be divided into a transparent part and a non-transparent part. The MS may define these issues e.g. in the above-mentioned BCIE element or in another way in call set-up signalling.

On the basis of the request by the MS the MSC allocates an interworking function IWF which supports the requested service to the call. The IWF comprises an RA and MUX/DEMUX unit 74 according to the invention, which is similar to the unit illustrated in FIG. 6. The IWF also comprises an L2R/RLP unit 93 and a unit 91 according to the non-transparent protocol of the fixed network. In the direction of the fixed network the unit 91 functions according to the selected non-transparent protocol (e.g. V.120). The IWF further comprises a multiplexing and demultiplexing unit 92, which multiplexes the transparent information flow 75 to the transparent part of the fixed network traffic channel and the non-transparent information flow 76' to the non-transparent part.

A normal transparent GSM traffic channel of 28.8 kbits/s is established between the RA and MUX/DEMUX unit 73 of the mobile station and the IWF RA and MUX/DEMUX unit 74. In fact, this is a high-speed HSCSD traffic channel which consists of two basic channels of 14.4 kbits/s. A suitable share of the traffic channel, e.g. 24 kbits/s, has been allocated for transparent transmission and the rest, e.g. 4.8 kbits/s, for non-transparent transmission.

In the non-transparent part of the traffic channel a radio link protocol is established between the RLP-L2R/RLP units 88 and 93. Thus a combined T+NT traffic channel of the invention which enables a multiservice call has been established between the mobile station MS and the interworking function IWF. The fixed network traffic channel of 32 kbits/s is also divided into a transparent part, e.g. 24 kbits/s, and a non-transparent part, e.g. 8 kbits/s. According to the ITU-T standard H.221, sub-channels of e.g. 32 kbits/s and 8 kbits/s may be defined for a channel of 64 kbits/s for multimedia applications in the ISDN network. Such channel configuration can be assigned using a BAS signal (Bit Rate Allocation Signal) according to H.221, for instance. This signal enables transmission of code words which describe the capability of the terminal equipment to structure the capacity of a channel or several channels and order the receiver to demultiplex and utilize the signals of these structures. In the embodiment of FIG. 9 the multiplexing and demultiplexing unit 92 sets the traffic channel configuration of the fixed network according to the request by the MS using e.g. a BAS signal or other inband signalling. Alternatively, the configuration of the fixed channel can be set in call set-up signalling which the MSC transmits to the fixed network when the channel is being established.

A share of 24 kbits/s of the fixed network channel is allocated for transparent transmission. Thus the transparent part of the connection uses the same bit rate, i.e. 24 kbits/s, in both the GSM network and the fixed network, and a transparent connection is established between the MS and the terminal/server of the fixed network. The IWF adjusts this constant rate bit stream between the GSM transmission frames and the fixed network transmission frames.

A share of 8 kbits/s of the fixed network channel is allocated for non-transparent transmission. For this purpose a fixed network non-transparent protocol, e.g. V.120, is established between the unit 91 of the IWF and the corresponding unit of the fixed network terminal/server. Establishment of a non-transparent protocol on both the GSM connection and the fixed network connection solves the problem related to the prior art when the gross bit rates of the traffic channels are different, as in this case 28.8 kbits/s in the GSM network and 32 kbits/s in the fixed network. Since the flow control and buffering of both non-transparent protocols in the interworking function IWF ensure data integrity and adjust the possible difference in the bit rate, the bit rate of the non-transparent part of the GSM traffic channel and the bit rate of the non-transparent part of the fixed network can be freely set to different values. This enables allocation of the same bit rate for transparent transmission on both subconnections. Considering the use of radio channel resources, it is preferable if the capacity of the GSM traffic channel is slightly smaller than that of the fixed network traffic channel. In that case "useless" capacity is reserved from the fixed network where this matters less.

After the combined point-to-point T+NT connection according to the invention has been established, information transmission can be started. Video 81, audio 82 and any other multimedia data 83 are multiplexed in the multiplexer 84 into a transparent information flow 75 which is multiplexed by the unit 73 to the transparent part of the GSM traffic channel. The L2R/RLP unit 88 correspondingly combines the data from the applications 85 to 87 into a non-transparent information flow 76, which is multiplexed to the non-transparent part of the GSM traffic channel by the unit 73. In the interworking function IWF the unit 74 demultiplexes the transparent information flow 75 and the non-transparent information flow 76 from the GSM traffic channel. The non-transparent information flow 76 is supplied to the L2R/RLP unit 93, which clears the RLP frames and transmits the data (e.g. over the V.24 interface) to the fixed network protocol unit 91. The unit 91 structures the data according to the fixed network protocol (e.g. V.120) and produces a non-transparent information flow 76'. The multiplexing and demultiplexing unit 92 multiplexes the transparent information flow to the transparent part of the fixed network traffic channel and the non-transparent information flow to the non-transparent part of the fixed network traffic channel. A corresponding multiplexing and demultiplexing device 92 in the terminal or server of the fixed network demultiplexes the information flows 75 and 76 from the fixed network channel for further processing. The function of the unit 92 is preferably in accordance with recommendation H.221. Reverse operations are carried out in the opposite transmission direction.

In the embodiment described above allocation of the sub-channels of the GSM traffic channel was defined in the call set-up signalling. Allocation can also be performed by means of inband negotiation between the MS and the IWF. The MS may also define the desired fixed network traffic channel configuration for the IWF by means of similar inband negotiation.

Both in FIG. 8 and in FIG. 9 logical sub-channels can be established in the RLP connection by defining logical channel identifiers e.g. inside the information field of the RLP frames. Such use of several logical channels allows to run several point-to-point service sessions simultaneously through one RLP connection. In FIGS. 8 and 9, for example, each application 85 to 87 can have a dedicated logical channel through the RLP connection.

The invention has been described above by means of preferred embodiments. It should be noted that there are alternative solutions and variations which are obvious to a person skilled in the art and can be implemented without deviating from the scope and spirit of the appended claims.

What is claimed is:

1. A method of transmitting two or more different information flows simultaneously in one call in a mobile communication network, comprising:
   assigning one mobile network traffic channel to the call;
   establishing the traffic channel assigned to said call as a transparent traffic channel;
   negotiating division of the transparent traffic channel into at least two sub-channels between a mobile station and the mobile communication network or between two mobile stations;
   dividing the assigned traffic channel into said at least two sub-channels; and
   transmitting at least one information flow in each of the at least two sub-channels.

2. A method according to claim 1, comprising:
   negotiating division of the traffic channel into sub-channels by means of inband signalling, such as signalling based on a radio link protocol intended for a non-transparent connection, between the mobile station and the network terminal or between two mobile stations.

3. A method according to claim 1, wherein the assigned traffic channel is divided into sub-channels in one of the following manners:
dividing the assigned traffic channel into at least two transparent sub-channels, or
dividing the assigned traffic channel into at least two non-transparent sub-channels, or
dividing the assigned traffic channel into one or more transparent sub-channels and into one or more non-transparent sub-channels.

4. A method according to claim 1, further comprising:
forming at least one of said two or more different information flows which are transmitted over said sub-channels by multiplexing it from two or more user data signals.

5. A method according to claim 1, further comprising:
establishing two or more logical non-transparent channels in a non-transparent sub-channel.

6. A method according to claim 1, wherein said assigned traffic channel is a high-speed traffic channel consisting of two or more basic-rate traffic channels or data streams.

7. A method of making a multiservice or multimedia call between two mobile stations in a mobile communication network, comprising:
establishing one transparent traffic channel through the mobile communication network between two mobile stations for the multiservice or multimedia call;
negotiating division of the transparent traffic channel into at least two sub-channels between each mobile station and a network terminal or between the two mobile stations;
dividing said transparent traffic channel into said at least two sub-channels between the mobile stations; and
transmitting different information flows of the multiservice or multimedia call in different sub-channels.

8. A method according to claim 7, further comprising:
negotiating division of the traffic channel into sub-channels by means of inband signaling, such as signalling based on a radio link protocol intended for a non-transparent connection, between the mobile station and the network terminal or between two mobile stations.

9. A method according to claim 7, wherein an assigned traffic channel is divided into sub-channels in one of the following manners:
dividing the assigned traffic channel into at least two transparent sub-channels, or
dividing the assigned traffic channel into at least two non-transparent sub-channels, or
dividing the assigned traffic channel into one or more transparent sub-channels and into one or more non-transparent sub-channels.

10. A method according to claim 7, further comprising:
dividing the transparent traffic channel into one or more transparent sub-channels and into one or more non-transparent sub-channels;
transmitting time-critical information which does not allow the use of an error correction protocol based on retransmission over the transparent sub-channel; and
transmitting less time-critical information which allows the use of an error correction protocol based on retransmission over the non-transparent sub-channel.

11. A method according to claim 7, further comprising:
forming at least one of said information flows which are transmitted over said sub-channels by multiplexing it from two or more user data signals.

12. A method according to claim 7, further comprising:
establishing two or more logical non-transparent channels in a non-transparent sub-channel.

13. A method according to claim 7, wherein said transparent traffic channel is a high-speed traffic channel consisting of two or more basic-rate traffic channels or data streams.

14. A method of transmitting two or more different information flows simultaneously in one call in a mobile communication network comprising:
assigning one mobile traffic channel to the call;
establishing the traffic channel assigned to said call as a transparent traffic channel;
negotiating division of the transparent traffic channel into at least two sub-channels between a mobile station and the mobile communication network or between two mobile stations;
dividing the assigned traffic channel into said at least two sub-channels;
transmitting at least one information flow in each of the at least two sub-channels;
dividing the traffic channel into one or more transparent sub-channels and into one or more non-transparent sub-channels;
transmitting time-critical information, which does not allow the user of an error correction protocol based on retransmission, over the transparent transmission sub-channel; and
transmitting less time-critical information, which allows the use of an error correction protocol based on retransmission, over the non-transparent sub-channel.

15. A method of making a multiservice or multimedia call between a mobile station and a party in a fixed telecommunications network, the point-to-point connection including a mobile network traffic channel leg and a fixed network traffic channel leg and an interworking function between the traffic channel legs, the method comprising:
establishing one transparent traffic channel with a bit rate of R1 between the mobile station and the interworking function;
establishing a transparent fixed network traffic channel with a bit rate of R2 between the interworking function and the party in the fixed telecommunications network;
allocating a first part of both the fixed network traffic channel leg and the mobile network traffic channel leg for transparent transmission, the first part having a bit rate of R3, when wherein R3<R1 and R3<R2;
allocating a second part of the mobile network traffic channel leg for non-transparent transmission, the second part of the mobile network traffic channel leg having a bit rate of R1–R3;
allocating a second part of the fixed network traffic channel leg for non-transparent transmission, the second part of the fixed network traffic channel leg having a bit rate of R2–R3;
performing point-to-point transparent data transmission through the first parts of said fixed network and mobile network traffic channels at a bit rate of R3; and
performing point-to-point non-transparent data transmission through the second parts of said fixed network and mobile network traffic channels using buffering and flow control in the interworking function.

16. A method according to claim 15, wherein R1 is different from R2.

17. A method according to claim 16, wherein $R_1<R_2$.

18. A mobile station comprising:

means for making a multiservice or multimedia call in a mobile communication network;

means for dividing a traffic channel, which is established for a multiservice or multimedia call through the mobile communication network to another mobile station or interworking function, into at least two sub-channels; and means for transmitting different information flows of the multiservice or multimedia call in different sub-channels of a common traffic channel, wherein said assigned traffic channel is a high-speed traffic channel consisting of two or more basic-rate traffic channels or data streams.

19. A mobile station according to claim 18, wherein the mobile station further comprises means for negotiating division of the traffic channel with another mobile station or interworking function.

20. A mobile station according to claim 18, wherein the at least two sub-channels of the traffic channel comprise one or more transparent sub-channels and one or more non-transparent sub-channels, and the mobile station is arranged to transmit time-critical information which does not allow the use of an error correction protocol based on retransmission over the one or more transparent sub-channels and less time-critical information which allows the use of an error correction protocol based on retransmission over the one or more non-transparent sub-channels.

21. A mobile station according to claim 18, wherein the mobile station further comprises means for establishing two or more logical non-transparent channels in the one or more non-transparent sub-channels.

22. A mobile communication network, comprising:

means for making a multiservice or multimedia call;

means for establishing a fixed network traffic channel between an interworking function of the mobile communication network and a party in a fixed network;

means for dividing said fixed network traffic channel into at least one transparent sub-channel and at least one non-transparent sub-channel, the bit rate of the transparent sub-channel of the fixed network traffic channel being the same as the bit rate of a transparent sub-channel of a mobile network traffic channel;

means for adapting the transparent sub-channel of the mobile network traffic channel to the transparent sub-channel of the fixed network traffic channel for point-to-point transparent transmission;

means for adapting a non-transparent sub-channel of the mobile network traffic channel to the non-transparent sub-channel of the fixed network traffic channel for point-to-point non-transparent transmission; and means for transmitting different information flows of the multiservice or multimedia call in different sub-channels of a common traffic channel between the mobile communication network and a mobile station.

23. A mobile communication network according to claim 22, wherein the mobile communication network further comprises means for negotiating traffic channel division with the mobile station.

24. A mobile communication network according to claim 22, wherein the sub-channels of the mobile network traffic channel and the fixed network traffic channel comprise one or more transparent sub-channels and one or more non-transparent sub-channels, and that the mobile communication network is arranged to transmit time-critical information which does not allow the use of an error correction protocol based on retransmission over the one or more transparent sub-channels and less time-critical information which allows the use of an error correction protocol based on retransmission over the one or more non-transparent sub-channels.

25. A mobile communication network according to claim 22 wherein said fixed traffic channel is a high-speed traffic channel consisting of two or more basic-rate traffic channels or data streams.

26. A mobile communication network comprising:

means for making a multiservice or multimedia call between a mobile station and a party in the fixed telecommunications network, the call being a point-to-point connection including a mobile network traffic channel leg and a fixed network traffic channel leg and an interworking function between the traffic channel legs;

means for establishing one transparent traffic channel with a bit rate of R1 between the mobile station and the interworking function;

means for establishing a transparent fixed network traffic channel with a bit rate of R2 between the interworking function and the party in the fixed telecommunications network;

means for allocating a first part of both the fixed network traffic channel leg and the mobile network traffic channel leg for transparent transmission, the first part having a bit rate of R3, wherein R3<R1 and R3<R2;

means for allocating a second part of the mobile network traffic channel leg for non-transparent transmission, the second part of the mobile network traffic channel leg having a bit rate of R1–R3;

means for allocating a second part of the fixed network traffic channel leg for non-transparent transmission, the second part of the fixed network traffic channel leg having a bit rate of R2–R3;

means for performing point-to-point transparent data transmission through the first parts of said fixed network and mobile network traffic channels at a bit rate of R3; and means for performing point-to-point non-transparent data transmission through the second parts of said fixed network and mobile network traffic channels using buffering and flow control in the interworking function.

* * * * *